United States Patent [19]
Stottlemyer

[11] Patent Number: 5,388,926
[45] Date of Patent: Feb. 14, 1995

[54] COMPOSITE COUPLING FOR TOWED ARRAYS

[75] Inventor: Thomas R. Stottlemyer, Mystic, Conn.

[73] Assignee: The United States of America as represented by the Secretary of the Navy, Washington, D.C.

[21] Appl. No.: 20,932

[22] Filed: Feb. 22, 1993

[51] Int. Cl.⁶ .................. G01Y 1/00; H01R 13/00
[52] U.S. Cl. .................. 403/294; 403/404; 403/292; 403/372; 439/349; 439/624; 367/154
[58] Field of Search ............ 367/20, 154; 285/305, 285/297, 294; 439/349, 624, 194, 205; 403/372, 375, 307, 292, 294, 203, 179, 404, 24

[56] References Cited
U.S. PATENT DOCUMENTS

| | | | |
|---|---|---|---|
| 1,873,245 | 8/1932 | Abegg | 285/305 |
| 3,507,532 | 4/1970 | Gross et al. | 285/305 |
| 3,606,402 | 9/1971 | Medney | |
| 3,759,553 | 9/1973 | Carter | 285/305 |
| 3,860,742 | 1/1975 | Medney | 285/305 |
| 3,999,786 | 12/1976 | Powondra | 285/297 |
| 4,821,241 | 4/1989 | Berglund | 367/154 |
| 5,062,085 | 10/1991 | Andrews | 367/154 |

Primary Examiner—Randolph A. Reese
Assistant Examiner—Anthony Knight
Attorney, Agent, or Firm—Michael J. McGowan; Prithvi C. Lall; James M. Kasischke

[57] ABSTRACT

A coupling for joining sections of an underwater towed acoustical array includes male and female couplers. The male coupler has an annular end portion with an axial bore that receives a first towed array section and a first connector and an annular body integral with and extending coaxially from the annular end portion. An outer groove is disposed around an outer circumference of the annular body. The female coupler has an annular end portion and an axial bore that receives a second towed array section and a second connector and a cup-shaped body portion integral with and extending from the annular end portion. The cup-shaped body portion has an inner groove disposed on the inner surface and an aperture through the cup-shaped body portion communicating with the inner groove. The inner groove is located so as to be in registry with the male coupler outer groove when the annular body is inserted into the cup-shaped body portion to form an annular channel. A retaining means, in the form of a cord or ball bearings, is inserted through the aperture and into the annular channel to maintain the annular body in fixed position within the cup-shaped body portion.

15 Claims, 3 Drawing Sheets

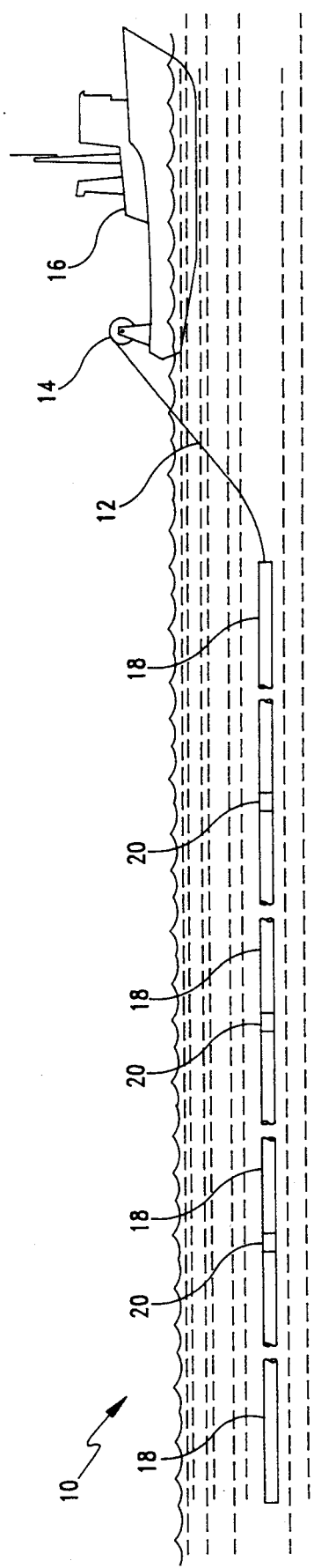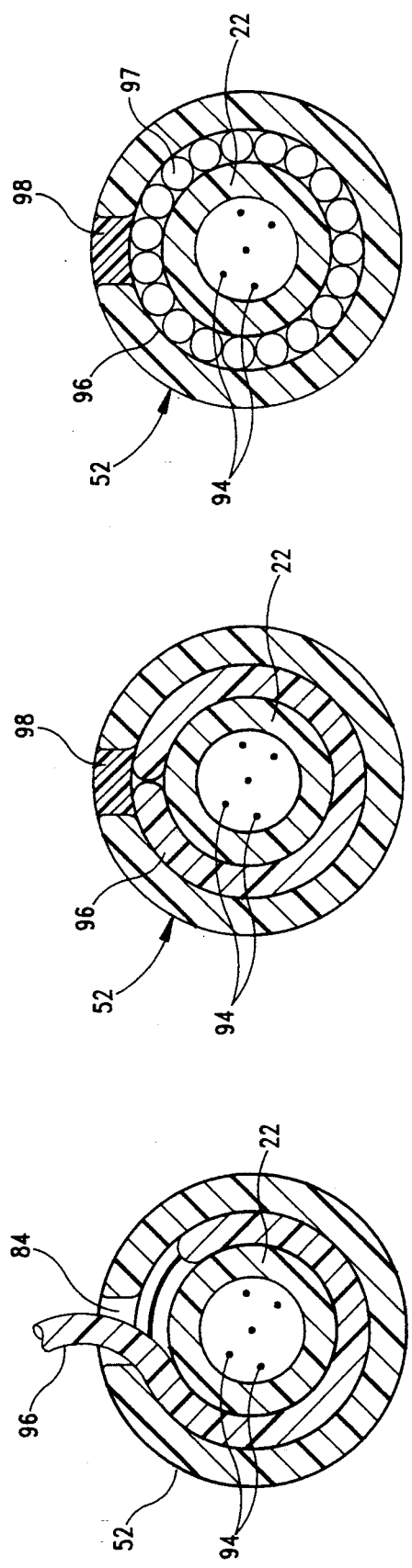

COMPOSITE COUPLING FOR TOWED ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates generally to underwater towed transducer arrays and, more particularly, to a coupling fabricated from a non-metallic, composite material and operable to join adjacent sections of towed transducer arrays while simultaneously reducing towed array self-noise.

2. Description of the Prior Art

Our desire to detect foreign submarines and ships in the face of improving foreign technology has led to the development of ever-increasingly sensitive oceanographic instrumentation operable to, for example, detect or monitor sound underwater. However, the development of improved systems for supporting highly sensitive towed acoustic arrays has not kept pace with the development of the instrumentation itself. As a result, serious problems attributed to mechanical and electrical interaction between the instrumentation and their support systems has been uncovered. In general, a typical towed acoustic array system includes an electrical signal-carrying, weighted cable towed from a vessel, a vibration isolation module connected to the underwater end to the tow cable, an acoustical array containing one or more hydrophones or transducers connected to the vibration isolation module and electrical signal receiving and processing equipment connected with the shipboard end of the tow cable. Each of the transducers in the acoustical array is operable to produce electrical signals responsive to detected sound pressure waves travelling underwater. The electrical signals produced by the transducers pass through the vibration isolation module and the tow cable to the electrical signal receiving and processing equipment located aboard ship. This electrical equipment manipulates the electrical signals received in a well known fashion to determine the range and bearing of an acoustic signal in the ocean.

An example of a support system which has failed to keep pace with improved towed acoustic array systems is the coupling used to join individual sections of the acoustical array. Typically, the acoustical array, or acoustical transducer array, is formed from a series of individual towed array sections joined in end-to-end fashion. The individual sections are joined via metallic couplings, and these metallic couplings have been found to both mechanically and electrically interact with the acoustical array so as to denigrate the quality of the electrical signals that are produced by the array. In particular, these presently used metallic couplings have been found to produce sag between adjacent acoustical array sections due to the negative buoyancy of the metallic couplings themselves. This sag between adjacent sections disrupts the flow of water along the outer surface of the acoustical array at the location of each coupling as the acoustical array is pulled through the water by the tow vessel. This disruption of water flow causes turbulence around each of the couplings and results in an increase in towed acoustical array self-noise. This self-noise, in the form of sound pressure waves, is detected by the transducers in the towed acoustical array along with the sound pressure waves intended to be detected. It is apparent that these sound pressure waves, generated as a result of the negative buoyancy of the metallic couplings used to join a multiplicity of towed array sections, adversely affect the signal to noise ratio of the incoming acoustic signal.

Consequently, there is a need for a coupling operable to join individual towed acoustical array sections which overcomes the difficulties associated with the metallic coupling known and used today. In particular, there is a need for a coupling for joining adjacent towed acoustical array sections which is fabricated from a non-metallic, composite material to greatly reduce sag between adjacent towed array sections and thus reduce the amount of towed acoustical array self-noise.

SUMMARY OF THE INVENTION

The present invention relates to a coupling operable to join individual towed acoustical array sections and designed to satisfy the aforementioned needs. The coupling of the present invention is made from a non-metallic, composite material and therefore has a density approximating that of the towed array. Since the coupling has a density substantially the same as the array, it will produce only minimal sag between adjacent towed array sections when used to join these sections. As sag is minimized, acoustical array self-noise is greatly reduced. Since the coupling is made of a non-metallic material, it provides the added benefit of being impervious to corrosion.

Accordingly, the present invention is directed to a coupling for joining sections of an underwater towed acoustical array that includes male and female couplers. The male coupler has an annular end portion with an axial bore therethrough that receives a first towed array section and a first connector, and an annular body integral with and extending coaxially from the annular end portion. An outer groove is disposed around an outer circumference of the annular body. The female coupler has an annular end portion and an axial bore therethrough that receives a second towed array section and a second connector, and a cup-shaped body portion integral with and extending from the annular end portion. The cup-shaped body portion has an inner groove therein disposed on the inner surface thereof and an aperture through the cup-shaped body portion communicating with the inner groove. The inner groove is located so as to be in registry with the male coupler outer groove when the annular body is inserted into the cup-shaped body portion to thereby form an annular channel. A retaining means, in the form of a cord or ball bearings, is inserted through the aperture and into the annular channel to maintain the annular body in fixed position within the cup-shaped body portion so that the first and second connectors remain connected to provide a signal flow through the first and second array sections. Furthermore, the coupling is fabricated from a non-corrosive, low density composite material to eliminate coupling induced self-noise.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein:

FIG. 1 schematically illustrates an acoustical transducer array being towed beneath the surface of the water by a tow vessel, the array including a plurality of adjacent acoustical array sections coupled together by the coupling of the present invention;

FIG. 4 is a sectional view of the coupling taken along line 5—5 of FIG. 3 showing the retaining cord being inserted through the channel; and FIG. 5 is a sectional view of the coupling taken along line 5—5 of FIG. 3 showing the protective caps in place over the apertures to the channels.

FIG. 5A shows an alternative embodiment and is a view identical to FIG. 5 except that the retaining cord has been replaced with ball bearings.

DESCRIPTION OF THE PREFERRED EMBODIMENT

Figure 2:
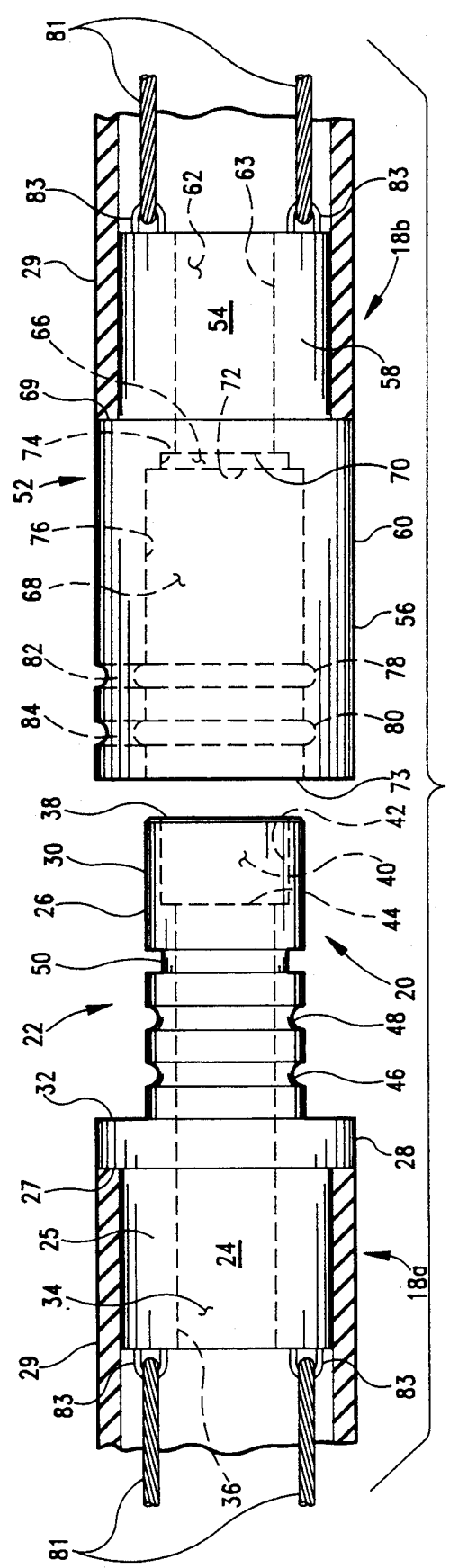
FIG. 2 is a side elevational view of the coupling of the present invention shown in a disassembled mode and illustrating the male and female couplers, the first and second electrical connectors being omitted from this view.

In the following description, like reference characters designate like or corresponding parts throughout the several views.

Referring now to the drawings, and particularly to FIG. 1, there is shown schematically an acoustical transducer array 10 secured to a weighted tow cable 12 which, in turn, is secured to a drum 14 positioned at the rearward end of a tow vessel 16. Acoustical transducer array 10 is dispensed from drum 14 in order to be put into operation and is typically towed through the water by vessel 16 at various depths. As known in the art, acoustical transducer array 10 houses a plurality of individual transducers or hydrophones spaced along its length, and each of the transducers is operable to produce electrical signals responsive to detected sound pressure waves travelling underwater. The electrical signals produced by the transducers are transmitted via suitable electrical wires and appropriate connectors that extend within and through acoustical transducer array 10 and electrical signal-carrying tow cable 12 and are received by electrical signal receiving and processing equipment (not shown) located aboard tow vessel 16. The electrical signal receiving and processing equipment manipulates the electrical signals received in a well known fashion to determine the range and bearing of an acoustic signal in the ocean.

Acoustical transducer array 10 is itself formed from a plurality of individual towed array sections 18 connected in end-to-end fashion by a plurality of couplings 20 of the inventive device. As will be described in detail herein, each of couplings 20 has a construction which facilitates joining adjacent array sections 18 together in such a manner so as to greatly reduce the sag between adjacent sections 18 which would otherwise occur if conventional metallic couplings were employed. The reduction in sag between adjacent array sections 18 greatly reduces the self-noise generated by acoustical transducer array 10 as it is being towed through the water by tow vessel 16 and thus increases the accuracy of the acoustic source information generated by the signal receiving and processing equipment.

Figure 3:
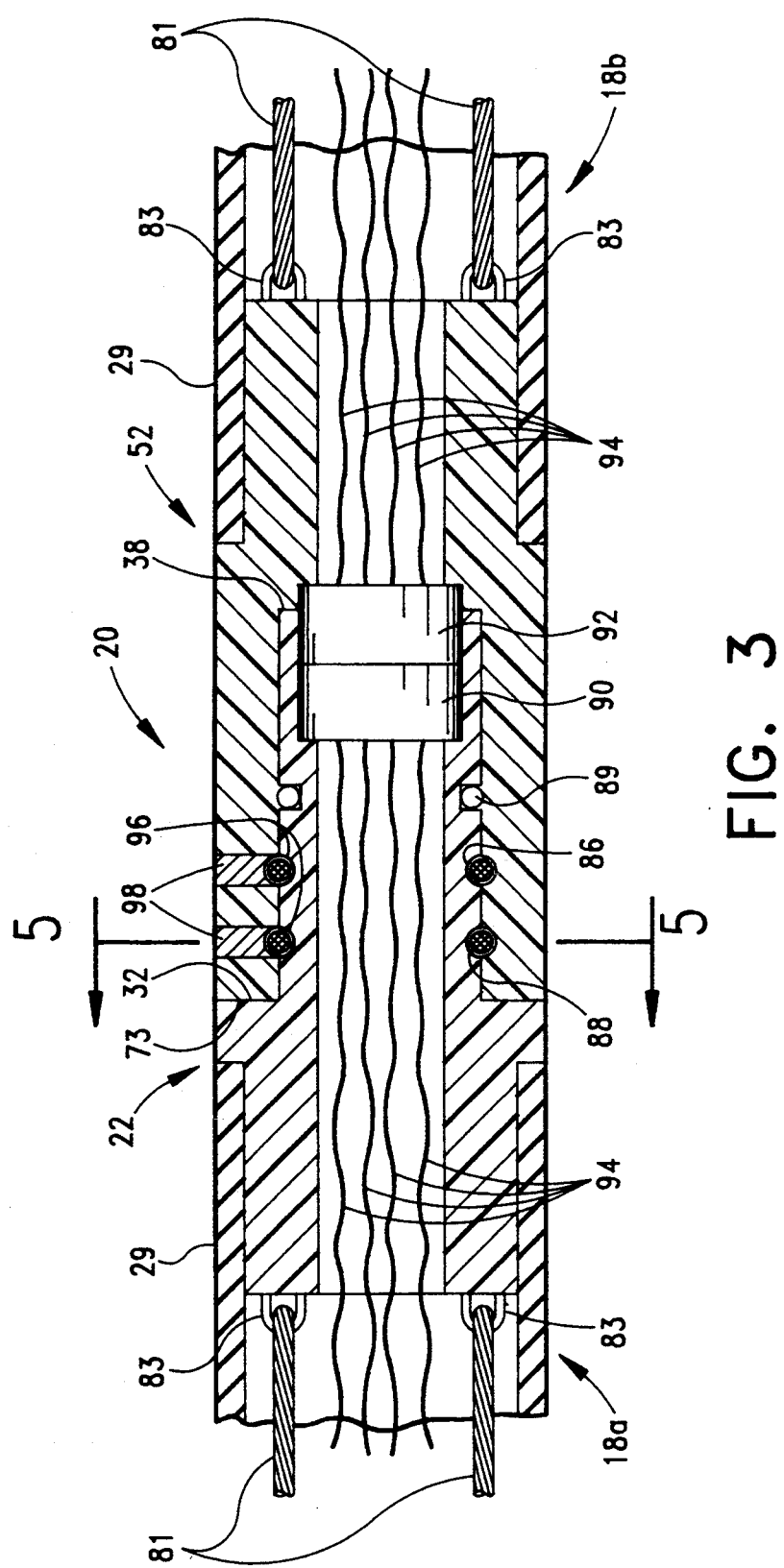
FIG. 3 is a side elevational, sectional view of the coupling being shown in an assembled mode with the first and second electrical connectors being shown in full.

FIGS. 2 and 3 show side elevational views of coupling 20 of the present invention for coupling together adjacent array sections 18a and 18b. FIG. 2 represents coupling 20 in a disassembled mode without electrical connectors whereas FIG. 3 is a sectional view, that represents coupling 20 in an assembled mode with the electrical connectors being shown in full. Coupling 20 includes a male coupler 22 with a male coupler end portion 24 and an insertable body portion 26, both of which having an annular configuration such that end portion 24 defines an end portion outer circular surface 28 and body portion 26 defines a body portion outer circular surface 30. Between end portion 24 and body portion 26 there is a body portion shoulder 32 with greater diameter than end portion 24 or body portion 26. Shoulder 32 allows for attachment of an elastomeric hose 29 which is a component of array section 18a about end portion 24. End portion 24 and insertable body portion 26 share a common bore 34 that defines an inner circular surface 36 that extends through the length of portions 24, 26. The free or distal end surface 38 of insertable body portion 26 is counterbored to form an enlarged bore 40 that defines an inner circular surface 42. Common bore 34 and enlarged bore 40 meet to define a shoulder 44 within the interior of insertable body portion 26. Defined on outer circular surface 30 of body portion 26 is a pair of outer grooves 46, 48 and a retaining notch 50 that extend around the outer circumference of body portion 26. Retaining notch 50 is preferably located between outer grooves 46, 48 and free end surface 38 of body portion 26. The function of grooves 46, 48 and retaining notch 50 will be described later herein in greater detail.

Coupling 20 also includes a female coupler 52 with a female coupler end portion 54 and a cup-shaped body portion 56. Cup-shaped body portion 56 has a larger diameter than end portion 54 thereby defining a shoulder 69 therebetween. End portion 54 and cup-shaped body portion 56 are also of an annular configuration, thereby defining an outer circular surface 58 on end portion 54 and a cylindrical wall 60 on cup-shaped 56. As with array section 18a, an elastomeric hose 29, which is a component of array section 18b, is attached to circular surface 58 of end portion 54 and abuts shoulder 69. Bore 62 extends completely through end portion 54 to define an inner circular surface 63. Cup-shaped body portion 56 includes a pair of increasingly larger counter bores 66, 68 which serve to increase the size of the opening through female coupler 52 in a step-like fashion. Bore 62 extends partially into cup-shaped body portion 56 thereby defining a shoulder 70 where bore 66 meets bore 62. A shoulder 72 is defined where bore 68 meets bore 66 which defines an inner circular surface 74. Bore 68, which defines an inner circular surface 76, extends between shoulder 72 and open free end 73 of cup-shaped body portion 56. The diameter of bore 68 allows male coupler body portion 26 to be inserted into cup-shaped body portion 56 of female coupler 52 until shoulder 32 of male coupler 22 abuts open free end 73 of cup-shaped body portion 56 as seen in FIG. 3.

Still referring to FIGS. 2 and 3, inner circular surface 76 of cup-shaped body portion 56 is provided with a pair of parallel grooves 78, 80 that extend around the circumference of inner surface 76. Inner grooves 78 and 80 are located so as to be in registry with outer grooves 46 and 48 of male coupler 22 when body portion 26 is inserted into cup-shaped body portion 56 of female coupler 52. When grooves 80 and 46 and grooves 78 and 48 are in registry with one another, a pair of corresponding annular channels 86, 88 (FIG. 3) of circular cross-section are formed between insertable body portion 26 of male coupler 22 and cup-shaped body portion 56 of female coupler 52. Access to this pair of annular channels 86, 88 is accomplished via a pair of apertures 82, 84 that are formed in cup-shaped body portion 56, extending through cylindrical wall 60 so as to communicate with inner grooves 78, 80.

As also seen in FIGS. 2 and 3, each array section 18a, 18b includes a pair of strength bearing members 81 for carrying mechanical loads associated with each respective array section 18a, 18b. For each array section 18a, 18b, members 81 extend within elastomeric hose 29, from one end thereof to the distal end thereof. Members 81 are preferably of wire rope or of synthetic fiber materials and are attached to a pair of spaced apart brackets 83 disposed on the outer end face of female coupler end portion 54 and the outer end face of male coupler end portion 24. Also, since coupling 20 is used in underwater applications, an o-ring 89 (FIG. 3 only) is located in retaining notch 50 of body portion 26 of male coupler 22 so as to provide a water tight seal between the male and female couplers 22, 52 when assembled.

As shown in FIG. 3, adjacent array sections 18a, 18b are electrically connected to one another by electrical connectors 90, 92. Connector 90 is suitably connected and disposed within body portion 26 of male coupler 22 of coupling 20, and connector 92 is suitably connected and disposed within body portion 56 of female coupler 52. Associated with each connector 90, 92 are conventional lead wires 94 that extend through sections 18a, 18b and other adjacent sections 18 of acoustical array 10 for transmitting the signals to the electrical signal receiving and processing equipment (not shown) located aboard tow vessel 16 as previously discussed above. Connectors 90, 92 can be standard pin or coaxial connection devices but are not limited to these types. It is apparent from FIG. 3 that as body portion 26 of male coupler 22 is inserted into cup-shaped body portion 56 of female coupler 52, respective connectors 90, 92 are brought into connecting relationship with each other, thus providing an electrical signal flow path through array sections 18a, 18b and thus through other coupled sections 18 which make up transducer array 10. In order to maintain body portion 26 of male coupler 22 in fixed position within cup-shaped body portion 56 of female coupler 52 and thus maintain electrical connectors 90, 92 in electrical communication with each other, further apparatus of the current invention can be utilized.

As best seen in FIGS. 3, 4 and 5, a cord 96 made from a flexible, high shear strength material such as nylon is used as a retaining means to maintain male and female couplers 22, 52 in an assembled configuration. Cord 96 is inserted into each aperture 82, 84 in cup-shaped body portion 56 so as to fill respective annular channels 86, 88 formed by corresponding grooves 80, 46 and 78, 48. Cords 96 prevent male and female couplers 22, 52 from separating when coupling 20 is subjected to axial loads experienced when in use. Preferably, cords 96 should completely fill the pair of annular channels 86, 88, and any excess cord protruding from apertures 82, 84 should be removed. As an alternative, non-corrosive objects, such as stainless steel or elastomeric ball bearings 97 can be used in place of cords 96 as shown in FIG. 5A. As seen in FIGS. 3 and 5, once cords 96 have been cut off, caps 98 having a force fit are then pressed into apertures 82, 84 to preserve flow over apertures 82, 84 and retain cords 96 (or ball bearings) within channels 86, 88.

Male and female couplers 22, 52 are preferably machined from a solid, low density, non-metallic composite material, the overall density of coupling 20 should close to that of array 10. One particular composite material which has been successfully utilized has a nylon matrix with arimid fibers approximately one-quarter (0.25) inches long randomly dispersed throughout the composite material. In tests performed on a coupling fabricated from a nylon matrix composite material and employing nylon 6/6 cords to join the male and female couplers, the coupling itself sustained all loads to which it was subjected and the nylon cords began to deform at 12,720 pounds.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the form hereinbefore described being merely a preferred or exemplary embodiment thereof.

What is claimed is:

1. A coupler device for joining a first section of an underwater towed acoustical array terminating in a first connector with a second section of an underwater towed acoustical array terminating in a second connector, comprising:

a male coupler having a male coupler annular end portion for receiving said first towed array section at the end thereof, an annular body integral with and extending coaxially from said male coupler annular end portion and having at least one outer groove disposed around an outer circumference of said annular body, said male coupler having an axial bore therethrough for receiving said first connector disposed on the terminal end of said first towed array section;

a female coupler having a female coupler annular end portion for receiving said second towed array section at the end thereof, a cup-shaped body portion having a cylindrical wall, an open free end, and a fixed end, said cup-shaped body portion integral with and coaxially extending from said female coupler annular end portion with said open free end oriented away from said female coupler annular end portion and said cylindrical wall having at least one inner groove disposed circumferentially about the inner surface thereof, said at least one inner groove being located to be in registry with said at least one outer groove in said annular body when said annular body is inserted into said cup-shaped body portion, said inner and outer grooves thereby forming a channel between said annular body and said cup-shaped body portion, said cylindrical wall having an aperture defined therethrough for communicating to said channel formed by said inner and outer grooves, and said female coupler having an axial bore extending through said female coupler annular end portion and said fixed end of said cup-shaped body portion for receiving said second connector disposed on the terminal end of said second array section and allowing joining of said first connector with said second connector when said male coupler is inserted in said female coupler;

retaining means insertable into said channel through said aperture for maintaining said annular body in fixed position within said cup-shaped body portion to preserve the connection between said male coupler and female coupler and thereby join said first and second towed array sections;

a first bracket disposed on said male coupler end portion for attachment of strength bearing members extending the length of said first array section; and a second bracket disposed on said female coupler end portion for attachment of strength bearing members extending the length of said second array section, said male and female couplers each being fabricated from a non corrosive, low density material to eliminate coupling induced self noise created by fluid flow over said coupler.

2. The coupler as recited in claim 1, further comprising a protective cap installable to cover said aperture in said cup-shaped body portion for retaining said retaining means within said annular channel.

3. The coupler as recited in claim 1, further comprising:

said male coupler annular body having a retaining notch disposed therein and extending around said outer circumference thereof; and an o-ring positioned within said retaining notch operable to provide a water-tight seal between said male coupler and said female coupler when said male coupler annular body is inserted into said female coupler cup-shaped body portion.

4. The coupler as recited in claim 1, wherein said retaining means comprises a section of cord insertable within said annular channel between said annular body and said cup-shaped body portion to retain said annular body axially within said cup-shaped body portion.

5. The coupler as recited in claim 4, wherein said male and female couplers are each fabricated from a composite material having a nylon matrix with arimid fibers randomly dispersed throughout said nylon matrix.

6. The coupler as recited in claim 5, wherein said arimid fibers are each approximately one-quarter (0.25) inch long.

7. The coupler as recited in claim 1, wherein said retaining means comprises a plurality of ball bearings insertable within said annular channel between said annular body and said cup-shaped body portion to retain said annular body axially within said cup-shaped body portion.

8. The coupler as recited in claim 7, wherein said male and female couplers are each fabricated from a composite material having a nylon matrix with arimid fibers randomly dispersed throughout said nylon matrix.

9. The coupler as recited in claim 8, wherein said arimid fibers are each approximately one-quarter (0.25) inch long.

10. A coupler device for joining a first section of an underwater towed acoustical array terminating in a first connector with a second section of an underwater towed acoustical array terminating in a second connector, comprising:

a male coupler having a male coupler annular end portion for receiving said first towed array section at the end thereof, an annular body integral with and extending coaxially from said male coupler annular end portion, said annular body having at least one outer groove disposed circumferentially thereabout, said male coupler having an axial bore therethrough for receiving said first connector disposed on the terminal end of said first towed array section, and said male coupler having an integral body portion shoulder interposed between said male coupler annular end portion and said annular body with a larger diameter than said male coupler annular end portion and said annular body thereby allowing said first towed array section to abut said body portion shoulder while being sealed about said male coupler annular end portion;

a female coupler having a female coupler annular end portion for receiving said second towed array section at the end thereof, a cup-shaped body portion having a cylindrical wall, an open free distal end, and a fixed end, said cup-shaped body portion cylindrical wall inner diameter allowing insertion of said male coupler annular body and said cup-shaped body portion cylindrical wall outer diameter being larger than the diameter of said female coupler annular end portion thereby defining a shoulder therebetween and allowing said second towed array section to abut said shoulder while being sealed about said female coupler annular end portion, said cup-shaped body portion being integral with and coaxially extending from said female coupler annular end portion with said open free distal end oriented away from said female coupler annular end portion and said cylindrical wall having at least one inner groove disposed circumferentially about the inner surface thereof, said at least one inner groove being located to be in registry with said at least one outer groove in said annular body when said annular body is inserted into said cup-shaped body portion, said inner and outer grooves thereby forming a channel between said annular body and said cup-shaped body portion, said cylindrical wall having an aperture defined therethrough for communicating to said channel formed by said inner and outer grooves, and said female coupler having an axial bore extending through said female coupler annular end portion and said fixed end of said cup-shaped body portion for receiving said second connector disposed on the terminal end of said second array section and allowing joining of said first connector with said second connector when said male coupler is inserted in said female coupler;

retaining means insertable into said channel through said aperture for maintaining said annular body in fixed position within said cup-shaped body portion to preserve the connection between said male coupler and female coupler and thereby join said first and second towed array sections;

a first bracket disposed on said male coupler end portion for attachment of strength bearing members extending the length of said first array section; and a second bracket disposed on said female coupler end portion for attachment of strength bearing members extending the length of said second array section;

said male and female couplers each being fabricated from a non-corrosive, low density material to eliminate coupling induced self noise created by fluid flow over said coupler.

11. The coupler as recited in claim 10, further comprising a protective cap installable to cover said aperture in said cup-shaped body portion for retaining said retaining means within said annular channel.

12. The coupler as recited in claim 10, further comprising:

said male coupler annular body having a retaining notch disposed therein and extending around said outer circumference thereof; and an o-ring positioned within said retaining notch operable to provide a water-tight seal between said male coupler and said female coupler when said male coupler annular body is inserted into said female coupler cup-shaped body portion.

13. The coupler as recited in claim 10, wherein said male and female couplers are each fabricated from a composite material having a nylon matrix with arimid fibers randomly dispersed throughout said nylon matrix.

14. The coupler as recited in claim 13, wherein said retaining means is a section of cord insertable within said annular channel between said annular body and said cup-shaped body portion to retain said annular body axially within said cup-shaped body portion.

15. The coupler as recited in claim 13, wherein said retaining means comprises a plurality of ball bearings insertable within said annular channel between said annular body and said cup-shaped body portion to retain said annular body axially within said cup-shaped body portion.

* * * * *